(12) United States Patent
Chung et al.

(10) Patent No.: US 10,645,089 B2
(45) Date of Patent: May 5, 2020

(54) TERMINAL FOR INTERNET OF THINGS AND OPERATION METHOD OF THE SAME

(71) Applicants: SAMSUNG ELECTRONICS CO., LTD., Suwon-si, Gyeonggi-do (KR); KOREA ELECTRONICS TECHNOLOGY INSTITUTE, Seongnam-si, Gyeonggi-do (KR)

(72) Inventors: Ji-min Chung, Yongin-si (KR); Seung-woo Kum, Yongin-si (KR); Young-sun Ryu, Seongnam-si (KR); Tae-beom Lim, Yongin-si (KR)

(73) Assignees: SAMSUNG ELECTRONICS CO., LTD., Suwon-si, Gyeonggi-do (KR); KOREA ELECTRONICS TECHNOLOGY INSTITUTE, Seongnam-si, Gyeonggi-do (KR)

( * ) Notice: Subject to any disclaimer, the term of this patent is extended or adjusted under 35 U.S.C. 154(b) by 0 days.

(21) Appl. No.: 14/831,272

(22) Filed: Aug. 20, 2015

(65) Prior Publication Data
US 2016/0112433 A1    Apr. 21, 2016

(30) Foreign Application Priority Data
Oct. 17, 2014    (KR) .................. 10-2014-0141205

(51) Int. Cl.
*H04L 29/06*    (2006.01)
*H04W 4/70*    (2018.01)
(Continued)

(52) U.S. Cl.
CPC ............ *H04L 63/104* (2013.01); *H04L 63/08* (2013.01); *H04L 63/0807* (2013.01);
(Continued)

(58) Field of Classification Search
CPC . H04L 63/08; H04L 63/0807; H04L 63/0884; H04L 63/104; H04L 67/12
See application file for complete search history.

(56) References Cited

U.S. PATENT DOCUMENTS

| | | | |
|---|---|---|---|
| 7,895,445 B1 * | 2/2011 | Albanese | .............. G06F 21/335 713/172 |
| 8,281,144 B2 | 10/2012 | Huh et al. | |

(Continued)

FOREIGN PATENT DOCUMENTS

| | | |
|---|---|---|
| CN | 102035846 A | 4/2011 |
| CN | 102035846 B | 7/2012 |

(Continued)

OTHER PUBLICATIONS

Search Report and Written Opinion dated Dec. 21, 2015 in counterpart International Patent Application No. PCT/KR2015/008644.

(Continued)

*Primary Examiner* — Hee K Song
(74) *Attorney, Agent, or Firm* — Nixon & Vanderhye, P.C.

(57) ABSTRACT

An example terminal includes a communication circuitry configured to communicate with a server; and a data processor configured to request the server to include a second user in a relationship group of a first user and to extend, to the relationship group, a range of authorization for an Internet of Things (IoT) apparatus registered as an apparatus of the first user.

20 Claims, 16 Drawing Sheets

(51) Int. Cl.
*H04W 4/08* (2009.01)
*H04L 29/08* (2006.01)

(52) U.S. Cl.
CPC .......... *H04L 63/0884* (2013.01); *H04L 63/20* (2013.01); *H04L 67/12* (2013.01); *H04W 4/08* (2013.01); *H04W 4/70* (2018.02)

(56) References Cited

U.S. PATENT DOCUMENTS

| | | | | |
|---|---|---|---|---|
| 2010/0142711 | A1* | 6/2010 | Weis | H04L 9/0833 380/277 |
| 2011/0161478 | A1* | 6/2011 | Formo | H04L 63/105 709/223 |
| 2012/0023165 | A1* | 1/2012 | Li | H04L 12/1822 709/203 |
| 2012/0159167 | A1* | 6/2012 | Lee | H04L 9/321 713/168 |
| 2014/0047322 | A1 | 2/2014 | Kim et al. | |
| 2014/0090031 | A1 | 3/2014 | Keeler et al. | |
| 2014/0157392 | A1 | 6/2014 | Smith et al. | |
| 2014/0244710 | A1 | 8/2014 | Sharma et al. | |
| 2014/0244768 | A1* | 8/2014 | Shuman | H04L 51/32 709/206 |
| 2014/0244834 | A1* | 8/2014 | Guedalia | H04L 67/16 709/224 |
| 2014/0256285 | A1* | 9/2014 | Koo | H04W 4/005 455/406 |
| 2014/0351592 | A1* | 11/2014 | Starsinic | H04L 63/0876 713/168 |
| 2015/0170529 | A1* | 6/2015 | Hafeez | G09B 5/00 434/350 |
| 2015/0180723 | A1* | 6/2015 | Kuo | H04L 41/5041 709/223 |
| 2015/0201022 | A1 | 7/2015 | Kim et al. | |
| 2015/0249672 | A1* | 9/2015 | Burns | H04L 12/66 726/4 |
| 2015/0350031 | A1 | 12/2015 | Burks et al. | |
| 2016/0072839 | A1* | 3/2016 | Mortimore, Jr. | H04L 63/20 726/1 |
| 2016/0112429 | A1* | 4/2016 | Sundaresan | H04L 63/08 726/4 |
| 2017/0142124 | A1* | 5/2017 | Mukhin | G06F 21/30 |

FOREIGN PATENT DOCUMENTS

| | | | |
|---|---|---|---|
| CN | 103377336 | 10/2013 | |
| EP | 2890073 A1 * | 7/2015 | .......... H04L 63/062 |
| EP | 1 921 577 | 5/2018 | |
| KR | 10-2014-0045829 | 4/2001 | |
| KR | 10-2005-0110375 | 11/2005 | |
| KR | 10-2007-0074397 | 7/2007 | |
| KR | 10-2014-0008667 | 1/2014 | |
| WO | WO 2014/131029 | 8/2014 | |

OTHER PUBLICATIONS

Extended Search Report dated Mar. 13, 2018 in counterpart European Patent Application No. 15851165.9.
Communication pursuant to Article 94(3) EPC dated Nov. 21, 2018 in counterpart European Patent Application No. 15851165.9.
Communication pursuant to Article 94(3) EPC dated Apr. 5, 2019 in counterpart European Patent Application No. 15851165.9.
Office Action dated Sep. 3, 2019 in counterpart Chinese Patent Application No. 201580046076.0 and English-language translation.
Nahavandipoor, Vandad, "iOS 8 Swift Programming Cookbook," released in Nov. 2014, 58 pages.

* cited by examiner

FIG. 7

| RELATIONSHIP INFORMATION OF FIRST USER ||
|---|---|
| USER GROUP | USER ID |
| FRIEND | – |
| COLLEAGUE | USER C, USER D |
| FAMILY | USER E, SECOND USER |

SELECT RELATIONSHIP OF THE SECOND USER

FIG. 14

| RELATIONSHIP INFORMATION OF FIRST USER | /420 |
|---|---|
| USER GROUP | USER ID |
| FRIEND | – |
| COLLEAGUE | USER C, USER D |
| FAMILY | USER E, SECOND USER |

TERMINAL FOR INTERNET OF THINGS AND OPERATION METHOD OF THE SAME

CROSS-REFERENCE TO RELATED APPLICATION

This application is based on and claims priority under 35 U.S.C. § 119 to Korean Patent Application No. 10-2014-0141205, filed on Oct. 17, 2014, in the Korean Intellectual Property Office, the disclosure of which is incorporated herein by reference in its entirety.

BACKGROUND

One or more example embodiments relate to terminals for the Internet of Things (IoT) and operation methods of the same, and more particularly, to terminals for the IoT and operation methods of the same whereby authorization(s) for IoT apparatuses may be shared among users.

The Internet of Things (IoT) refers to a technology that enables a variety of "things" to connect to the Internet through a computer chip and a communication function embedded in each of the "things." An IoT apparatus may be a general apparatus (or a "thing") to which IoT is applied. Examples of IoT apparatuses may include sensors, such as temperature sensors, humidity sensors, sound sensors, motion sensors, proximity sensors, gas sensing sensors, or heat sensing sensors; home appliances, such as refrigerators, CCTVs, TVs, washing machines, or dehumidifiers; electric lights; fire alarms; and household appliances.

A user may remotely control an IoT apparatus by using an IoT terminal. The IoT terminal and the IoT apparatus may be connected to each other via various communication techniques, such as wireless communication, short distance (wired or wireless) communication, home network, or other communication protocols. In this case, a right to control a user's ability to access IoT apparatuses and control the same (e.g., turn on/off, input settings, etc.) is referred to as authorization.

However, an IoT apparatus may be placed in a shared space such as a house or an office. Therefore, a plurality of users may try to control the IoT apparatus. Accordingly, this may cause a problem regarding a sequence of granting authorization to access and control the IoT apparatus to the users.

SUMMARY

One or more example embodiments include terminals for the Internet of Things (IoT) and operation methods of the same whereby authorization to access and control IoT apparatuses may be efficiently shared among users.

Additional aspects will be set forth in part in the description which follows and, in part, will be apparent from the description, or may be learned by practice of the example embodiments.

According to one or more example embodiments, a terminal includes a communicator (e.g., modem, transceiver, radio or other communication circuitry) configured to communicate with a server; and a data processor configured to request the server to include a second user in a relationship group of a first user, and to extend a range of authorization for an IoT apparatus registered as an apparatus of the first user to the relationship group.

The data processor may select a user group from among a plurality of user groups as the relationship group.

The terminal may further include an input unit or device (e.g., buttons, keys, switches, touchpad, touchscreen, etc.) configured to receive input from the first user for selecting of the user group from among the user groups as the relationship group.

Various kinds of user groups (e.g., friends, family, colleagues) may be defined in advance by the server.

The input unit or device may further receive input from the first user for selecting the range of authorization of the IoT apparatus as the relationship group such that, for example, members of the relationship group can access and control the IoT apparatus.

According to one or more example embodiments, a terminal includes a communicator configured to communicate with a server; and a data processor configured to accept a request from a first user to include a second user in a relationship group of the first user so that the second user can control an IoT apparatus registered as an apparatus of the first user, wherein a range of authorization for the IoT apparatus is within the relationship group.

According to one or more example embodiments, an operation method of a server includes receiving a request to include a second user in a relationship group of a first user from a first terminal accessing the server using a first identifier, which is an identifier of the first user; and extending authorization of an IoT apparatus registered as an apparatus of the first user to the relationship group, in response to the request received from the first terminal.

The operation method may further include receiving an acceptance of the request to include the second user in the relationship group of the first user from a second terminal accessing the server using a second identifier, which is an identifier of the second user; and transmitting information about the IoT apparatus to the second terminal, wherein authorization for accessing and controlling the IoT apparatus is extended to the relationship group.

The operation method may further include receiving a request to control the IoT apparatus from the second terminal; and controlling the IoT apparatus.

The operation method may further include registering the IoT apparatus as an apparatus of the first user.

The operation method may further include selecting, by the first terminal, the relationship group from among a plurality of user groups.

The operation method may further include storing relationship information of the first user, the relationship information including information about a user (or users) included in each of the user groups for the first user.

The operation method may further include storing registered apparatus information of the first user, the registered apparatus information including information about each range of authorization corresponding to at least one of the registered IoT apparatuses registered as the apparatus of the first user.

The operation method may further include issuing a token of authorization for the second user corresponding to the IoT apparatus and transmitting the token to the second terminal.

The operation method may further include receiving a request to control the IoT apparatus with the token from the second terminal; confirming authorization of the second user for the IoT apparatus based on the token; and controlling the IoT apparatus.

According to one or more example embodiments, a server includes a memory that may store relationship information of a first user, the relationship information including information about a user (or users) included in each of a plurality of user groups for the first user, and also store registered apparatus information of the first user, the registered apparatus information including information about each range of authorization corresponding to at least one IoT apparatus registered as an IoT apparatus of the first user; and a data processor configured to detect whether an IoT apparatus to which authorization may be granted to a second user exists among the registered apparatuses based on the relationship information of the first user and the registered apparatus information of the first user.

When the data processor detects that authorization for a first apparatus, which is one apparatus from among the registered apparatuses, is granted to the second user, the data processor may transmit information about the first apparatus to a terminal accessing the server using a second identifier of the second user.

The data processor may receive a request to control the first apparatus from the terminal and control the first apparatus.

The data processor may issue a token of authorization for the second user corresponding to the first apparatus and transmit the token to the terminal; receive a request to control the first apparatus with the token from the terminal; confirm authorization of the second user to the first apparatus based on the token; and control the first apparatus.

BRIEF DESCRIPTION OF THE DRAWINGS

These and/or other aspects will become apparent and more readily appreciated from the following description of the example embodiments, taken in conjunction with the accompanying drawings in which:

FIGS. 5 to 8 are views of illustrative screen images of an output unit of an example terminal;

FIG. 14 is a table regarding example relationship information of a first user which is stored in memory 230 of FIG. 12;

DETAILED DESCRIPTION

Figure 1:
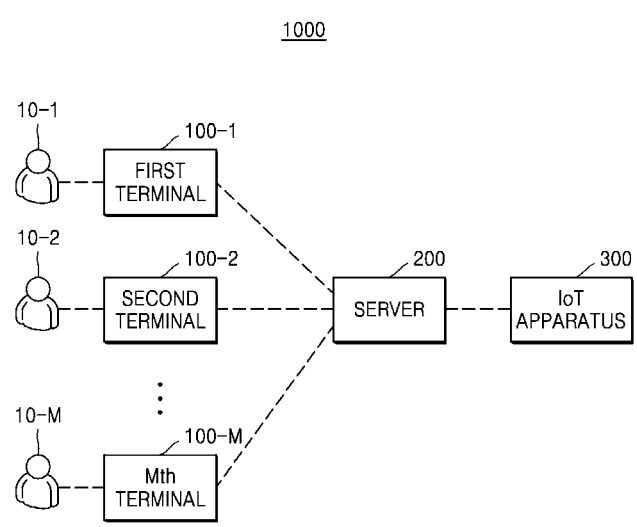
FIG. 1 is a configuration diagram of an example Internet of Things (IoT) system 1000.

Reference will now be made in detail to example embodiments which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects of the present description. Expressions such as "at least one of", when preceding a list of elements, modify the entire list of elements and do not modify the individual elements of the list.

The attached drawings for illustrating example embodiments of the present disclosure are referred to in order to gain a sufficient understanding of the present disclosure, the merits thereof, and objectives accomplished by the implementation of the present disclosure. In this regard, the present embodiments may have different forms and should not be construed as being limited to the descriptions set forth herein. Rather, these embodiments are provided so that this disclosure will be thorough and complete and will fully convey the concept of the present embodiments to one of ordinary skill in the art, and the present disclosure will only be defined by the appended claims.

Hereinafter, the terms used in the specification will be briefly described and then the present disclosure will be described in detail.

As used herein, an 'Internet of things (IoT) device' may refer to any electronic device or computing device that may be connected to the Internet.

As used herein, an 'IoT terminal' may refer to any electronic device or computing device that may control an IoT apparatus.

As used herein, a 'server' may be any electronic device or computing device capable of providing an IoT service by being connected to the IoT terminal so that the IoT terminal may remotely control the IoT apparatus by accessing the server.

The terms used in this specification are general terms currently widely used in the art in consideration of the functions regarding the concepts disclosed herein, but the terms may vary according to the intention of those of ordinary skill in the art, case precedents, or new technology in the art. Also, some terms may be arbitrarily selected by the applicant, and in this case, the meaning of the selected terms will be described in detail in the detailed description of the present specification. Thus, the terms used herein have to be defined based on the meaning thereof together with the description throughout the specification.

FIG. 1 is a configuration diagram of an example IoT system 1000.

Referring to FIG. 1, the IoT system 1000 may include terminals 100-1, 100-2, . . . , and 100-M, a server 200, and an IoT apparatus 300.

The terminals 100-1, 100-2, . . . , and 100-M are for controlling IoT apparatuses and may control the IoT apparatus 300 by being connected to the IoT apparatus 300 via a network. The terminals 100-1, 100-2, . . . , and 100-M may be any one of various electronic devices including, but not limited to, smart devices including smartphones or tablet PCs, portable electronic devices, wearable devices, home terminals that may be connected to a home network, smart TVs, set top boxes and the like.

The IoT apparatus 300 may be a general apparatus (or a thing) to which IoT is applied. Examples of the IoT apparatus 300 include, but are not limited to, sensors, such as temperature sensors, humidity sensors, sound sensors, motion sensors, proximity sensors, gas sensing sensors, or heat sensing sensors; home appliances, such as refrigerators, CCTVs, TVs, washing machines, or dehumidifiers; electric lights; fire alarms; and household appliances. However, the various embodiments described herein are not limited to these examples.

The IoT apparatus 300 may be controlled by a plurality of users 10-1, 10-2, . . . , and 10-M. Each of the users 10-1, 10-2, . . . , and 10-M may remotely control the IoT apparatus 300 through the server 200 by using the terminals 100-1, 100-2, . . . , and 100-M.

The server 200 may be a computer configured to provide an IoT service to the users 10-1, 10-2, . . . , and 10-M. Alternatively, the server 200 may be or include a computer-readable recording medium having recorded thereon a program for providing the IoT service. The server 200 may be wirelessly connected to each of the terminals 100-1, 100-2, . . . , and 100-M and the IoT apparatus 300. Therefore, the server 200 may communicate with each of the terminals 100-1, 100-2, . . . , and 100-M and the IoT apparatus 300. Accordingly, different terminals, for example, the first terminal 100-1 and the second terminal 100-2 may communicate with each other through the server 200. Furthermore, each of the terminals 100-1, 100-2, . . . , and 100-M may access the IoT apparatus 300 through the server 200 and control the same.

In FIG. 1, the first user 10-1 uses the first terminal 100-1, the second user 10-2 uses the second terminal 100-2. In other words, FIG. 1 illustrates that the users 10-1, 10-2, . . . , and 10-M use the terminals 100-1, 100-2, . . . , and 100-M, respectively. However, the users 10-1, 10-2, . . . , and 10-M may use respective terminals as illustrated in FIG. 1, or may use the same terminal. Terms such as the first terminal 100-1, the second terminal 100-2, and so on are used to distinguish users using the corresponding terminal.

Hereinafter, the first terminal 100-1 is a terminal used by the first user 10-1, and the second terminal 100-2 is a terminal used by the second user 10-2. Furthermore, the first terminal 100-1 may be a terminal accessing the server 200 using a first identifier, which is an identifier of the first user 10-1, and the second terminal 100-2 may be a terminal accessing the server 200 using a second identifier, which is an identifier of the second user 10-2.

Hereinafter, it is assumed that the first and second users 10-1 and 10-2 are already registered in the server 200. In other words, it is assumed that the first and second users 10-1 and 10-2 have respective accounts capable of using a service provided by the server 200 as the first and second users 10-1 and 10-2 access the server 200. A process of registering the first and second users 10-1 and 10-2 with the server 200 may be included in an example embodiment.

Figure 2:
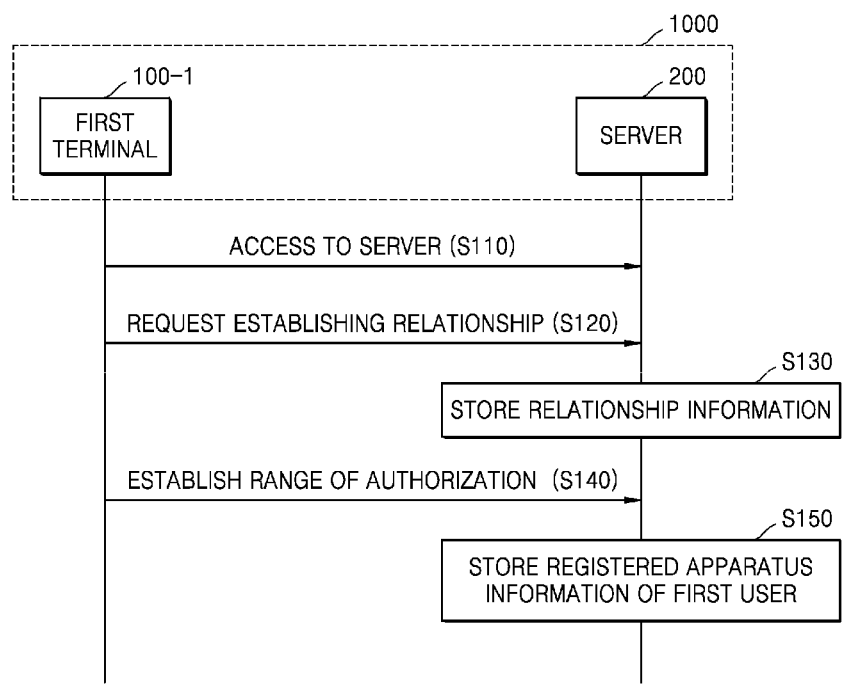
FIG. 2 is a flowchart of an illustrative method of operating the example IoT system 1000 of FIG. 1.

FIG. 2 is a flowchart of an illustrative method of operating the example IoT system 1000 of FIG. 1.

Referring to FIG. 2, the first terminal 100-1 may access the server 200 using the first identifier, which is an identifier of the first user (S110). The first terminal 100-1 may request the server 200 to establish a relationship between the first user and the second user (S120). The request for establishing the relationship may, for example, be a request for including the second user in a relationship group of the first user. The relationship group of the first user is a group that may include users related to the first user as members of the group. The relationship group of the first user may already include users having a previously established relationship with the first user rather than the second user.

The server 200 may store relationship information of the first user (S130). The relationship information of the first user may include information about the relationship group of the first user. The information about the relationship group of the first user includes, for example, information about which users are included in the relationship group of the first user. The server 200 may update the relationship information such that the second user is included in the relationship group of the first user.

An acceptance of the second user may be required when the first user requests establishing a relationship with the second user. In other words, a relationship between the first user and the second user may be established only when the second user accepts the request of the first user for establishing the relationship. In this case, the second user may be included in the relationship group of the first user only when the second user accepts the request for establishing the relationship. Therefore, the server 200 may store or update the relationship information based on some conditions or temporarily.

The first terminal 100-1 may request the server 200 to extend a range of authorization for an IoT apparatus registered as an apparatus of the first user to a relationship group (S140). Authorization for the IoT apparatus is a right granted to a user to be able to access the IoT apparatus and control the same through the server 200. The first user may have authorization for the IoT apparatus when the IoT apparatus is registered as an apparatus of the first user in the server 200. Not only the first user but also more than one user included in the relationship group may have authorization for the IoT apparatus when the range of authorization is extended to the relationship group. In other words, the one or more users included in the relationship group may also access the IoT apparatus through the server 200 and control the same. When the second user is included in the relationship group of the first user according to operation S120, the second user may also have authorization for the IoT apparatus that is the apparatus of the first user.

Hereinafter, 'a/the IoT apparatus registered as a/the apparatus of a/the first user' may be referred to as 'a/the registered apparatus of a/the first user'.

A plurality of IoT apparatuses may be registered as apparatuses of the first user in the server 200. An IoT apparatus to which authorization is extended to the relationship group in operation S140 may be a registered apparatus selected, by the first user, from among a plurality of registered apparatuses of the first user.

FIG. 2 illustrates that operation S140 of establishing a range of authorization is performed after operation S120 of requesting relationship establishing. However, operation S140 may be performed before operation S120.

The server 200 may store registered apparatus information of the first user (S150). The registered apparatus information of the first user may include information about at least one registered apparatus of the first user and information about a range of authorization corresponding to each respective registered apparatus. The server 200 may update the registered apparatus information of the first user with that the range of authorization for the IoT apparatus for which authorization is extended in operation S140.

Figure 3:
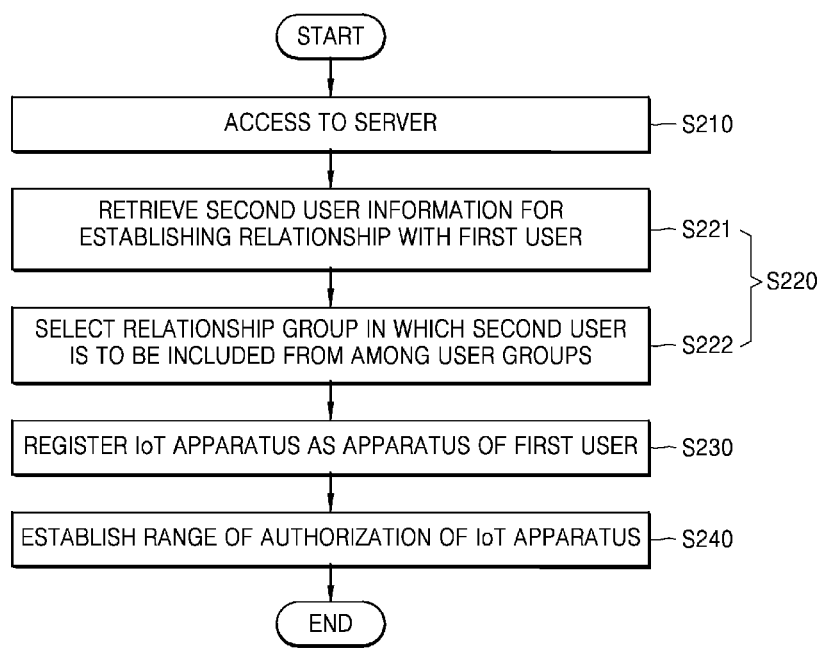
FIG. 3 is a flowchart of an illustrative method of operating an example first terminal of FIG. 1.

FIG. 3 is a flowchart of an illustrative operation method (S201) of the example first terminal 100-1 of FIG. 1. The above descriptions of the first terminal 100-1 of FIG. 2 may also apply to the operation method (S201) of FIG. 3.

Referring to FIGS. 1 and 3, the first terminal 100-1 may access the server 200 using the first identifier, which is an identifier of the first user (S210). The first terminal 100-1 may request establishing a relationship between the first user and the second user (S220). Operation S220 may include operation S221 and operation S222 as discussed below.

The first terminal 100-1 may retrieve information about the second user for use in establishing a relationship with the first user (S221). For example, the first terminal 100-1 may provide a keyword to the server for retrieving the second user information, and thus the server 200 may retrieve the second user information. Then the server 200 may provide the retrieved information to the first terminal 100-1. The keyword may be an identifier or a name, etc. of the second user. The first terminal 100-1 may receive an input in a keyword form from the first user.

The first terminal 100-1 may select a relationship group to which the second user is to be included from among a plurality of user groups (S222). For example, the user groups may include a family group, a friend group, a colleague group, and so on. For example, the relationship group to which the second user is to be included may be selected as the family group. Various kinds of user groups may be defined previously in the server 200. For example, the server 200 may previously define that the kinds of the user groups include a family group, a friend group and a colleague group. In other words, the kinds of the user groups in which the first user may establish a relationship with other users may be provided by the server 200. Alternatively or additionally, the first user may change the kinds of user groups and add new kinds of user groups.

The first terminal 100-1 may select a relationship group from among the user groups. In other words, the first user may select a relationship group from among the user groups provided by the server 200.

The first terminal 100-1 may register an IoT apparatus as an apparatus of the first user with the server 200 (S230). Operation S230 may be realized in various ways. For example, if the first user directly contacts a physical interface such as a button of the IoT apparatus after the first terminal 100-1 accesses the server 200 using a first identifier, which is an identifier of the first user, the IoT apparatus may be registered as an apparatus of the first user. Alternatively, if the first terminal 100-1 identifies an IoT apparatus based on a simple service discovery protocol (SSDP) or a Wi-Fi Protected Setup (WPS) and detects a corresponding IoT apparatus after accessing the server 200 using a first identifier, which is an identifier of the first user, the detected IoT apparatus may be registered in the server 200 as an apparatus of the first user. However, these are only examples and details of operation S230 in which the IoT apparatus is registered in the server 200 as an apparatus of the first user are not limited thereto.

The first terminal 100-1 may establish a range of authorization such that authorization for the IoT apparatus registered as an apparatus of the first user is extended to the relationship group (S240). The relationship group having the extended authorization may be a relationship group (e.g., a family group) from among the user groups such as a friend group, a colleague group, and a family group. Therefore, the second user to be included in the relationship group may have authorization for the IoT apparatus that is the registered apparatus of the first user.

There is no need to perform operations S220 to S240 in the first terminal 100-1 in the sequence shown in FIG. 3. For example, operations S230 and S240 may be performed before operation S220. Furthermore, operation S230 may be omitted if the IoT apparatus is already registered in the server 200 as an apparatus of the first user.

As described above, the authorization corresponding to the registered apparatus of the first user may be extended to the second user by establishing a relationship between the first user and the second user, according to an example embodiment. In this case, there is no need to register the registered apparatus of the first user with the server 200 as an apparatus of the second user. As described in operation S230, it may be complicated to register the IoT apparatus as an apparatus of a specific user. In other words, according to an example embodiment, the second user may have authorization corresponding to the registered apparatus of the first user without it being necessary to perform a complicated apparatus registering process. In summary, if a shared apparatus of multiple users is once registered as an apparatus of the first user, other users having a specific established relationship with the first user may have authorization for the shared apparatus without it being necessary to perform an iterative apparatus registering process. Therefore, user convenience may be improved.

Basically, the reason why authorization is granted to a user is to prevent other persons who do not have authorization from freely controlling an IoT apparatus of the user. In other words, it is important to ensure that authorization for the IoT apparatus is granted only to a user having a certain right or rights. According to an example embodiment, authorization for an IoT apparatus is extended to another user, that is, the second user, by the first user that is a registered user of the IoT apparatus. Therefore, it is ensured that authorization for the registered apparatus of the first user is extended to the second user having a right.

As described above, according to an example embodiment, it is ensured that authorization for the IoT apparatus is safely and efficiently shared among users.

Figure 4:
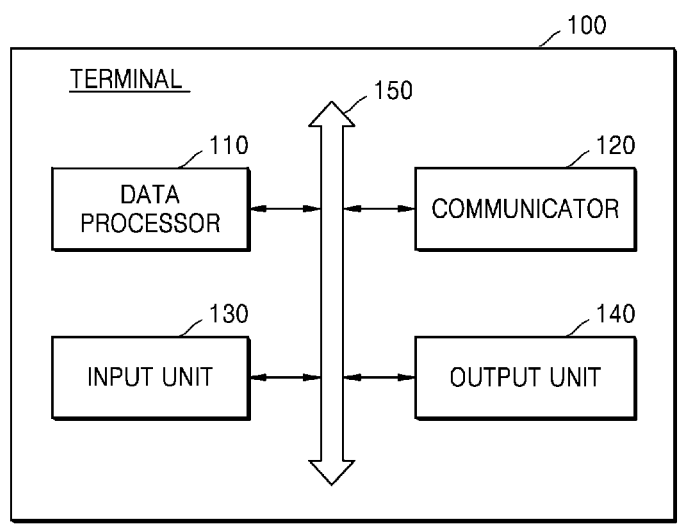
FIG. 4 is a configuration diagram of an example terminal 100.

FIG. 4 is a configuration diagram of an example terminal 100. The terminal 100 of FIG. 4 is an example embodiment of a terminal that may be used by each of the users 10-1, 10-2, . . . , and 10-M in the IoT system 1000 of FIG. 1. In other words, when an nth user uses the terminal 100 of FIG. 4, the terminal 100 of FIG. 4 may be the nth terminal 100-n (n=1, 2, . . . , M) of FIG. 1.

Referring to FIG. 4, the terminal 100 may include a data processor 110, a communicator 120, an input unit 130, and an output unit 140. Components included in the terminal 100 may be connected to each other via a bus 150. Some of the illustrated components may be omitted in some implementations, and the terminal 100 may include other components not illustrated.

The data processor 110 controls a general operation of the terminal 100, and furthermore, may process a variety of data required for the operation of the terminal 100. The data processor 110 may access a server using a first identifier, which is an identifier of the first user. In this case, the terminal 100 of FIG. 4 corresponds to the first terminal 100-1 of FIGS. 1 to 3. The data processor 110 may request establishing a relationship between the first user and the second user in order to include the second user in a relationship group of the first user. Furthermore, the data processor 110 may establish a range of authorization such that authorization for an IoT apparatus registered as an apparatus of the first user is extended to the relationship group.

A control operation of the first terminal 100-1 described above in FIGS. 1 to 3 or a data process required for the control operation may be performed in the data processor 110. The data processor 110 may be one of various devices such as a central processing unit (CPU), a micro processor, a graphic processing unit (GPU), an application specific integrated circuit (ASIC) and/or other type of circuitry.

The communicator 120 allows the terminal 100 to communicate with the server. The communicator 120 may include at least one component to allow the terminal 100 to communicate with an external device such as the server 200 (of FIG. 1) or the IoT apparatus 300. For example, the communicator 120 may include a short-range communication module, a wired communication module, a mobile communication module, and/or other type of communication circuitry.

The short-range communication module is a module including circuitry for performing short-range communication with a device located within a predetermined distance. As an example of a short-range communication technique according to the present exemplary embodiment, a wireless LAN, Wi-Fi, Bluetooth, ZigBee, Wi-Fi direct (WFD), an ultra wideband (UWB), an infrared data association (IrDA), Bluetooth low energy (BLE), a near field communication (NFC) may be used, but is not limited thereto.

The wired communication module is a module including circuitry for communication based on an electrical signal or an optical signal and may operate based on a wired communication technique via a pair cable, a coaxial cable, or an optical fiber cable, and the like.

The wireless communication module including transceiver circuitry for transceiving a wireless signal to at least one of a base station on a mobile communication network, an external device, and a server. For example, the wireless signal may be a voice call signal, a video communication call signal, or various types of data signal according to transceiving a text/multimedia message.

The input unit or device 130 and the output unit or device 140 may provide a user interface (UI) for a manipulation of the terminal 100 to a user. The output unit 140 may provide the UI for the manipulation of the terminal 100. The output unit 140 may include, for example, a speaker, a printer, a cathode ray tube (CRT) display, a liquid crystal display (LCD) display, a plasma display panel (PDP) display, an organic light emitting diode (OLED) display, a field emission display (FED) display, a light emitting diode (LED) display, a vacuum fluorescence display (VFD) display, a digital light processing (DLP) display, a flat panel display (FPD) display, a three-dimensional (3D) display, a transparent display, and/or various other output devices as will be apparent to one skilled in the art.

The input unit 130 may be used by a user to input a command for manipulation of the terminal 100. The input unit 130 may include, for example, a keyboard, a mouse, a touch screen, a voice recognizer, a fingerprints recognizer, an iris recognizer and/or other input devices as will be apparent to one skilled in the art.

When the terminal 100 of FIG. 4 is the first terminal 100-1 of FIGS. 2 and 3, the terminal 100 may perform the operations of FIGS. 2 and 3 via the UI. In this case, the UI may be provided by the server 200 (of FIG. 2).

Figure 5:
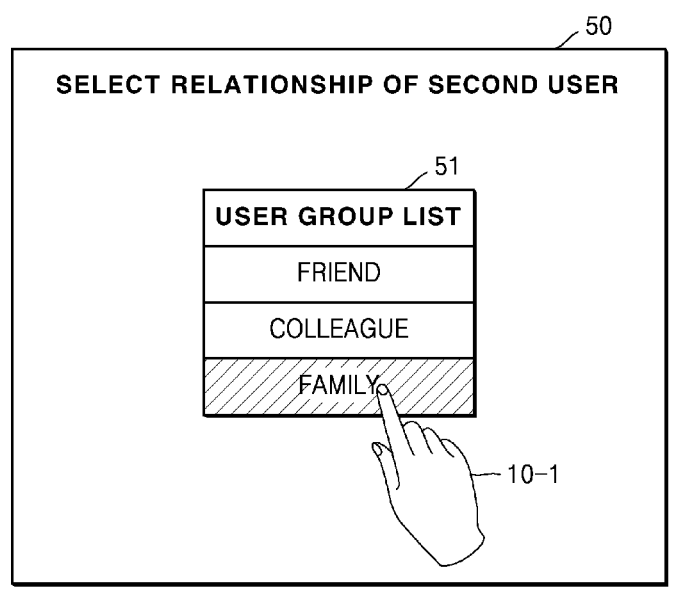

FIG. 5 is a view of an illustrative screen image 50 of an output unit (display) of an example terminal. The screen image 50 of FIG. 5 may be a screen image of the output unit 140 of the terminal 100 of FIG. 4.

Referring to FIG. 5, the screen image 50 may provide a UI whereby the first user 10-1 selects a relationship group (e.g., family) to which the second user is to be included from among a plurality of user groups (e.g., friend, colleague, and family groups). For example, the terminal 100 (of FIG. 4) may output the screen image 50 of FIG. 5 in order to perform operation S222 of selecting a relationship group to which the second user is to be included from among a plurality of user groups described with respect to FIG. 3.

A message including, for example, text and/or graphics, for selecting which user group from among a plurality of user groups of the first user 10-1 into which the second user should be included may be displayed on the screen image 50. FIG. 5 illustrates the message 'select relationship of the second user', but this is the only a non-limiting example.

Furthermore, a user group list 51, which is a list of the user groups that may be selected by the first user 10-1 may be displayed on the screen image 50. As in the example of FIG. 5, the user group list 51 may include a friend group, a colleague group, and a family group. The server 200 (of FIG. 2) may previously define the user groups and the user group list 51 may be displayed based on the previously defined user groups in the server 200 (of FIG. 2). The first user 10-1 may select the family group as a relationship group to which the second user is to be included by selecting 'family' from among user groups in the user group list 51. The first user 10-1 may select one of the user groups as the relationship group from among the user group list 51 by various methods such as touching, clicking, double-clicking, etc. The 'family' selected by the first user 10-1 may be displayed in a visually distinct manner from other user groups that are not selected.

Figure 6:
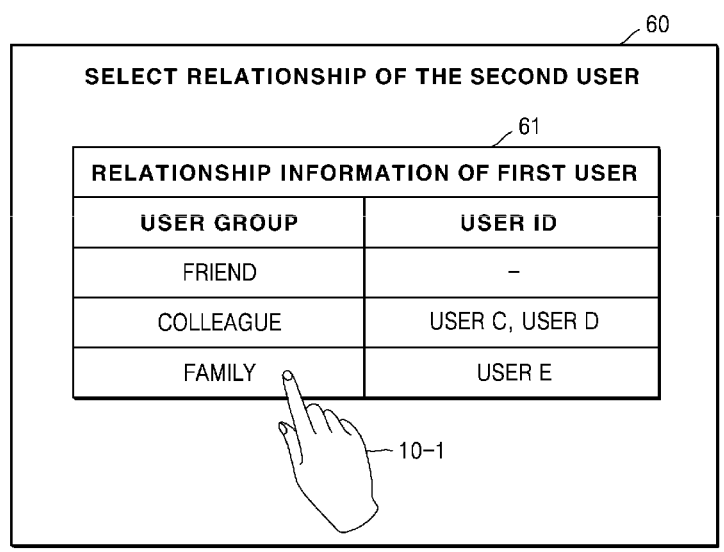

FIG. 6 is a view of an illustrative screen image 60 of an output unit of an example terminal. The screen image 60 of FIG. 6 may be a screen image of the output unit 140 of the terminal 100 of FIG. 4. The screen image 60 of FIG. 6 may be another example embodiment of the screen image 50 of FIG. 5.

Referring to FIG. 6, the screen image 60 may provide a UI whereby the first user 10-1 selects a relationship group (e.g., family) into which the second user is to be included from among a plurality of user groups (e.g., friend, colleague, and family groups), similar to the screen image 50 of FIG. 5.

As in FIG. 5, a message (including, for example, text and/or graphics) for selecting which user group from among a plurality of user groups of the first user 10-1 into which the second user should be included ('select relationship of the second user') may be displayed on the screen image 60.

Relationship information 61 of the first user may be displayed on the screen image 60 of FIG. 6. The relationship information 61 of the first user may include at least one user group (friend, colleague, and family groups) that may be selected by the first user 10-1 and a user ID representing a user included in each of the user groups. For example, there is no user in the friend group; users C and D are included in the colleague group; and user E is included in the family group. The first user 10-1 may grasp relationship information with other users that is previously established by the first user 10-1 through the relationship information 61 of the first user. Since FIG. 6 is only an example, there will be no information about the user ID in the relationship information 61 of the first user if the first user 10-1 has never established a relationship with other users before.

The first user 10-1 may select the family group as a relationship group to which the second user is to be included by selecting 'family' from the relationship information 61 of the first user.

If the first user 10-1 selects 'family' from the relationship information 61 of the first user, the screen image 60 of FIG. 6 may be converted into a screen image of FIG. 7. As in the screen image 60 of FIG. 7, a 'second user' may be added to the family group of the relationship information 61 of the first user. The relationship information 61 of the first user in FIG. 7 may be stored in the server 200 (see S130 of FIG. 2).

As in FIGS. 5 to 7, the first user 10-1 selects a relationship between the first and second users that is a relationship from among the user groups (friend, colleague, and family groups) that are previously defined. Since the relationships are previously defined and each of the relationships is determined by the selection of the first user, a process for determining the relationship between the first and second users may be performed via a simple algorithm. Therefore, a system overhead for determining the relationship between the first and second users may be very small.

According to the selection of the first user, the first terminal 100-1 may transmit a request to the server for establishing a relationship to include the second user to a relationship group (family) of the first user 10-1.

Figure 8:
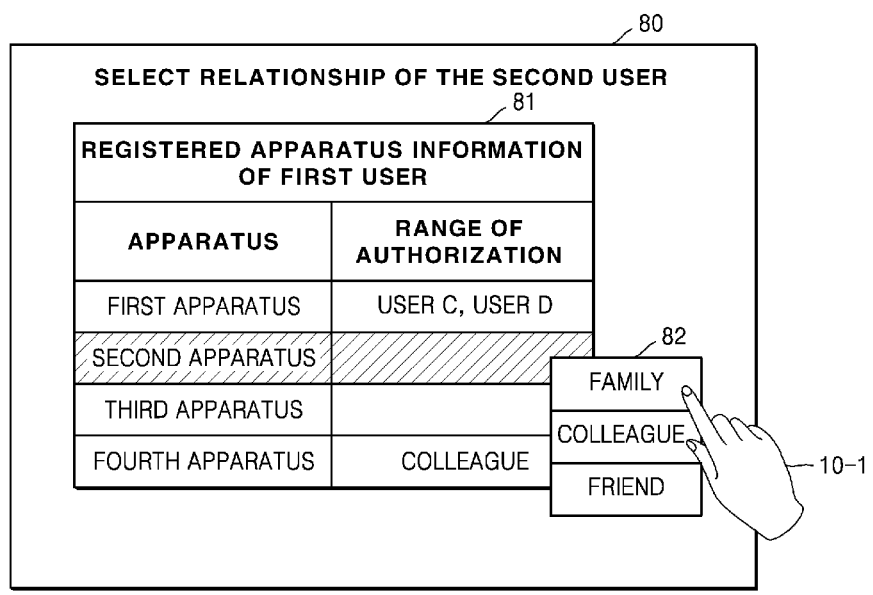

FIG. 8 is a view of an illustrative screen image 80 of an output unit of an example terminal. The screen image 80 of FIG. 8 may be a screen image of the output unit 140 of the terminal 100 of FIG. 4.

Referring to FIG. 8, the screen image 80 may provide a UI whereby the first user 10-1 establishes a range of authorization for an IoT apparatus (e.g., a second apparatus) registered as an apparatus of the first user 10-1. In other words, the terminal 100 (of FIG. 4) may output the screen image 80 of FIG. 8 in order to perform operations S140 and S240 of establishing the range of authorization described with respect to FIGS. 2 and 3.

Registered apparatus information 81 of the first user may be displayed on the screen image 80. The registered apparatus information 81 of the first user may include information about at least one registered apparatus (first to fourth devices) of the first user and information about a range of authorization (family, colleague, friend, and a blank) corresponding to each of the registered apparatuses. When the range of authorization is blank (may also be displayed as '-', NULL, or 'himself'), only the first user 10-1 may have authorization. For example, a range of authorization for the first device is a family, a range of authorization for the second and third devices is the first user 10-1 himself, and a range of authorization for a fourth device is a colleague. The first user 10-1 may grasp a range of authorization that is established previously by the first user 10-1 through the registered apparatus information 81 of the first user. As FIG. 8 is only an example, all ranges of authorization will be blank if the first user 10-1 has not previously established a range of authorization corresponding to the registered apparatus.

If the first user 10-1 selects a 'second device' from the registered apparatus information 81, an authorization selection window 82 for establishing the range of authorization for the second device may be displayed on the screen image 80. The authorization selection window 82 may include a family, a colleague, and a friend. The first user 10-1 may establish the range of authorization of the second device as 'family' by selecting 'family' from the authorization selection window 82.

The registered apparatus information 81 of the first user in FIG. 8 may be stored in the server 200 (see S150 of FIG. 2). In this case, the server 200 may store the registered apparatus information 81 of the first user by updating the range of authorization of the second apparatus to be within a family.

The UIs of FIGS. 5 to 8 are only examples and the example embodiments described herein are not limited to these UIs.

Figure 9:
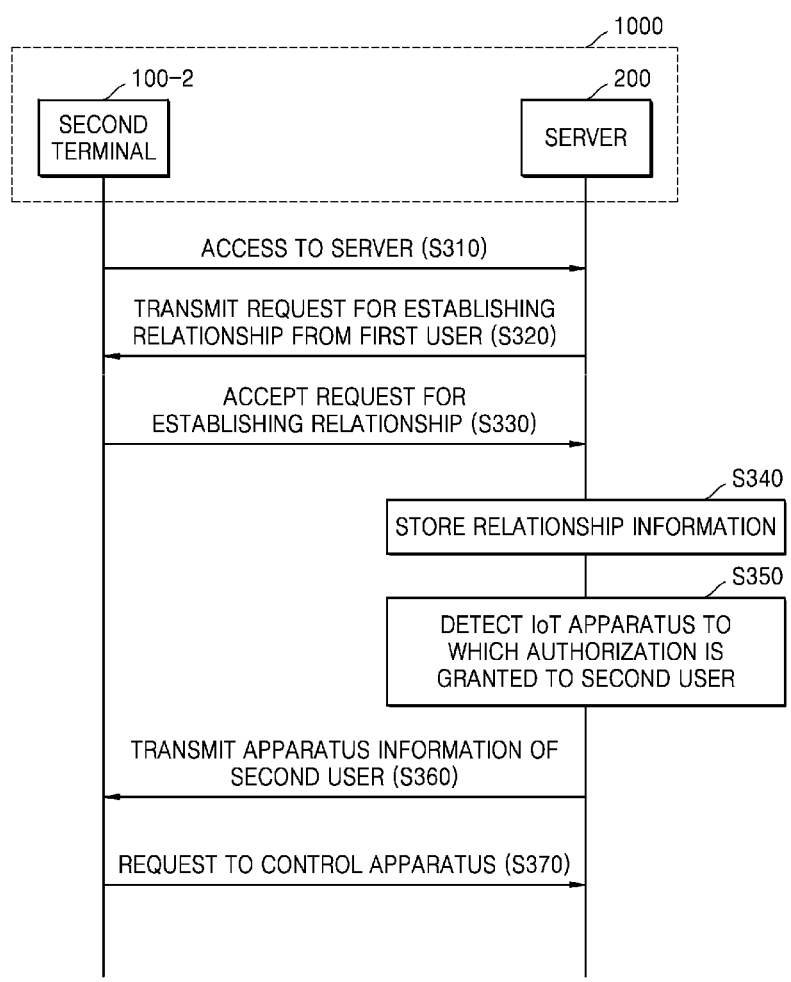
FIG. 9 is a flowchart of an illustrative method of operating the IoT system 1000 of FIG. 1.

FIG. 9 is a flowchart of an illustrative method of operating the example IoT system 1000 of FIG. 1.

Referring to FIGS. 1 and 9, the second terminal 100-2 may access the server 200 using a second identifier, which is an identifier of the second user (S310). The server 200 may transmit the request from the first user (S120 of FIG. 2) for establishing the relationship to the second terminal 100-2 (S320).

The second terminal 100-2 may accept the request for establishing the relationship from the first user (S330). A relationship between the first and second users may be established when the second terminal 100-2 accepts the request. The request for establishing the relationship from the first user may be about including the second user in a relationship group of the first user. Furthermore, the relationship group may be a user group selected by the first user from among a plurality of user groups.

The server 200 may store relationship information of the first user (S340). The server 200 may update the relationship information so as to include the second user in the relationship group of the first user and store the same. Therefore, the server 200 may store the relationship information of the first user, and furthermore, may store the registered apparatus information of the first user (S150 of FIG. 2).

The server 200 may detect whether an IoT apparatus to which authorization is granted to the second user exists among a plurality of registered apparatuses of the first user based on the relationship information of the first user and the registered apparatus information of the first user (S350). The server 200 may retrieve the relationship information of the first user and the registered apparatus information of the first user, and may detect whether an IoT apparatus with authorization extended to the second user exists.

If an IoT apparatus that is a registered apparatus of the first user and with authorization extended to the second user is detected, the server 200 may issue a token of authorization for the second user for the IoT apparatus. The server 200 may transmit the issued token to the second terminal 100-2. The token may, for example, be a string generated by combination of text. The token may be information shared between the server 200 and the second user, and users other than the second user may not use the token.

The server 200 may transmit apparatus information of the second user to the second terminal 100-2 based on the detection result (S360). The apparatus information of the second user may be information about at least one IoT apparatus to which authorization is granted to the second user. The apparatus information of the second user may include at least one of registered apparatus information of the second user and information of the IoT apparatus to which authorization is extended to the second user from among the registered apparatuses of the first user. The registered apparatus information of the second user is the information of the IoT apparatus registered by the second user and granting authorization to the second user.

For example, the second user may be established as 'family' of the first user (see FIG. 7), and a range of authorization corresponding to the second apparatus from among the registered apparatuses of the first user may be 'family' (see FIG. 8). In this case, the apparatus information of the second user may include information of the 'second apparatus'.

The second terminal 100-2 may request the server 200 to control the apparatus to which authorization is granted to the second user (S370). The second terminal 100-2 may request the server 200 to control the IoT apparatus (i.e., the 'second apparatus') to which authorization is granted to the second user from among the registered apparatuses of the first user. In this case, the second terminal 100-2 may request the server 200 to control the IoT apparatus (i.e., 'second apparatus') with the token issued from the server 200. The server 200 may confirm authorization of the second user corresponding to the IoT apparatus based on the token. In this way, the server 200 may issue and manage the token in order to verify authorization.

As the token is used, it is possible to avoid exposure of the account information of the second user in order to access the registered apparatus of the first user. If the account information including an ID and a password of the second user is exposed, every access authorization corresponding to a personal account of the second user may be acquired by unauthorized parties. As only the authorization corresponding to the registered apparatus of the first user is granted when the token is used, the account information of the second user may be protected effectively. Furthermore, the convenience and reliability of a system operation may be ensured by easily verifying the authorization granted to the second user with the token.

Referring again to FIG. 4, the terminal 100 of FIG. 4 may be the second terminal 100-2. In other words, the terminal 100 of FIG. 4 may be the second terminal 100-2 while the second user accesses the server 200 by using the terminal 100 of FIG. 4. The terminal 100 of FIG. 4 may perform an operation of FIG. 9 by using a UI. In this case, the UI may be provided by the server 200.

Figure 10:
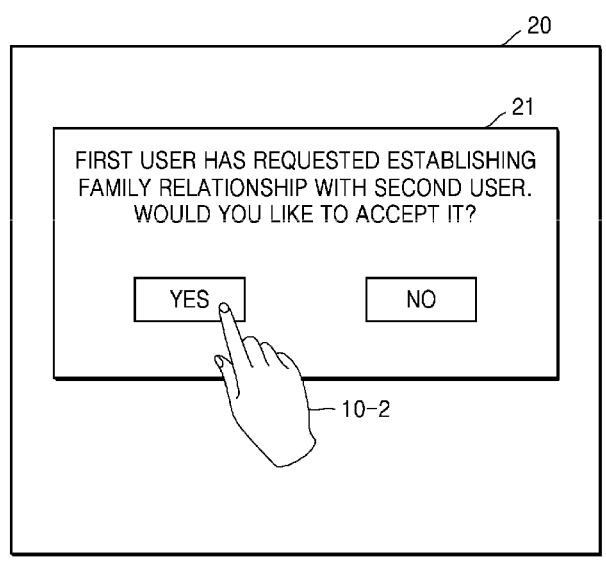
FIGS. 10 and 11 are views of illustrative screen images of an output unit of an example terminal.

FIG. 10 shows an illustrative screen image 20 of an example output unit of a terminal. The screen image 20 of FIG. 10 may be a screen image of the output unit 140 of the terminal 100 of FIG. 4.

Referring to FIG. 10, the screen image 20 may provide an UI 21 whereby the second user 10-2 confirms whether a request received from a first user for establishing a relationship therewith is accepted. In other words, the terminal 100 (of FIG. 4) may output the screen image 20 as illustrated in FIG. 10 in order to perform operation S330 of accepting the request for establishing the relationship described with respect to FIG. 9.

The UI 21 may display a message (including, e.g., text and/or graphics) confirming whether the request for establishing the relationship with the second user 10-2 is accepted. FIG. 10 illustrates a message such as 'The first user has requested establishing a family relationship with second user. Would you like to accept it?', but the message is not limited thereto. The UI 21 may further display icons ('Yes' or 'No') that allow selection of acceptance or denial of the request. The second user 10-2 may select one of the icons ('Yes' or 'No') in the UI 21 via various methods such as touching, clicking, or double-clicking.

The second user 10-2 may input information about accepting request for establishing a relationship between the first and the second users in the terminal 100 (of FIG. 4) by selecting the 'Yes' icon that indicates acceptance of the request in the UI 21 illustrated in FIG. 10.

Figure 11:
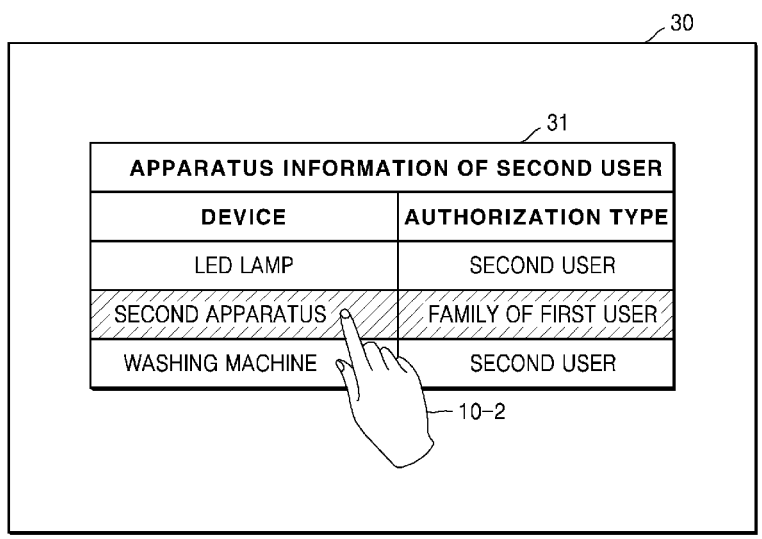

FIG. 11 shows an illustrative screen image 30 of an example output unit of a terminal. The screen image 30 of FIG. 11 may be a screen image of the output unit 140 of the terminal 100 of FIG. 4.

Referring to FIG. 11, the screen image 30 may display device information 31 of the second user. In other words, the terminal 100 (of FIG. 4) may output the screen image 30 of FIG. 11 after performing operation S360 of transmitting the device information of the second user explained with respect to FIG. 9.

The device information 31 of the second user includes information of at least one IoT apparatus to which authorization is granted to the second user 10-2. For example, the at least one IoT apparatus may be an LED lamp, a second apparatus, or a washing machine. The apparatus information 31 of the second user may further include authorization-type information. The authorization-type information may indicate whether authorization to the apparatus is granted because the apparatus is a registered apparatus of the second user or because a range of authorization is established as a specific (e.g., family) relationship with another user (e.g., a first user) and the authorization is extended thereby. For example, the authorization-type may be the second user or a family of the first user. The authorization-type information is only an example, and thus may be not included in the apparatus information 31 of the second user.

In the example of FIG. 11, the second user has authorization for the LED lamp and the washing machine since they are previously registered as apparatuses of the second user. The second user has authorization for the second apparatus since the second user is established as belonging to a family of the first user. The second user 10-2 may select a 'second apparatus' from the apparatus information 31 of the second user output from the screen image 30, and may control the 'second apparatus' by accessing it.

Figure 12:
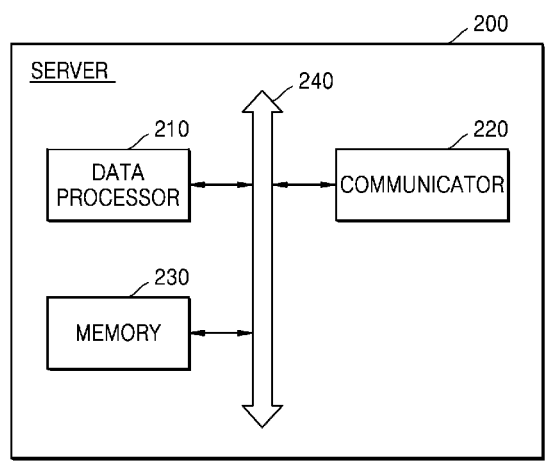
FIG. 12 is a configuration diagram of an example server 200.

FIG. 12 illustrates a configuration of an example server 200. The above descriptions of the example embodiment of the server 200 included in the IoT system 1000 of FIG. 1 may also apply to the server 200 of FIG. 12.

Referring to FIGS. 1 and 12, the server 200 may include a data processor 210, a communicator 220, and a memory 230. The components included in the server 200 may be connected to each other via a bus 240. Some of the illustrated components may be omitted in some implementations, and the server 200 may include other components not illustrated.

The data processor 210 may control a general operation of the server 200 and process a variety of data required for the operation of the server 200. The controlling of the operation of the server 200 or the processing of the data required for the operation may be performed in the data processor 210. The data processor 210 may be one of various devices such as a CPU, a micro processor, a GPU, an ASIC and/or other circuitry.

The communicator 220 may include at least one component for allowing the server 200 to communicate with an external device such as a plurality of terminals 100-1, 100-2, . . . , and 100-M, or the IoT apparatus 300. The communicator 220 may be wirelessly connected to the communicator 120 of the terminal 100 shown in FIG. 4. The descriptions of the communicator 120 in FIG. 4 may also apply to the communicator 220.

The memory 230 may store a variety of information or data for an operation of the server 200, such as user information, relationship information of a user, or registered apparatus information of a user.

The data processor 210 may detect whether an IoT apparatus to which authorization is granted to a second user exists among at least one registered apparatus of a first user based on relationship information of the first user which is stored in the memory 230 and registered apparatus information of the first user which is stored in the memory 230.

Figure 13:
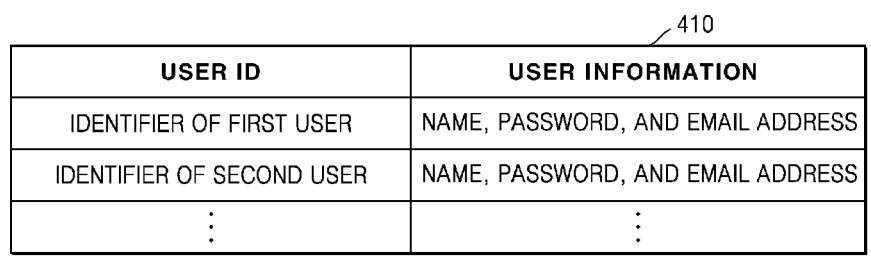
FIG. 13 is a table for example user information stored in memory 230 of FIG. 12.

FIG. 13 is an illustrative table for example user information 410 stored in the memory 230 of FIG. 12.

Referring to FIG. 13, the user information 410 is information of users registered in the server 200. The users registered in the server 200 may be identified by a user ID. The user information 410 may include a variety of user information such as a name, a password, and an email address of each of the users.

FIG. 14 is an illustrative table regarding example relationship information 420 of a first user which is stored in the memory 230 of FIG. 12.

Referring to FIG. 14, the relationship information 420 of the first user may include information of a plurality of user groups of the first user based on a user relationship established by the first user. The relationship information 420 of the first user may include a user ID representing a user included in each of the user groups. Even though FIG. 14 illustrates only the relationship information 420 of the first user, the memory 230 of FIG. 12 may also store the relationship information with respect to other users.

Figure 15:
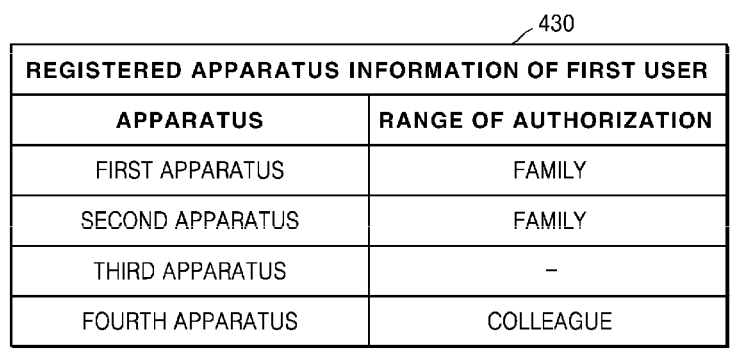
FIG. 15 is a table regarding example registered apparatus information of the first user which is stored in memory 230 of FIG. 12.

FIG. 15 is an illustrative table regarding example registered device information 430 of a first user which is stored in the memory 230 of FIG. 12.

Referring to FIG. 15, the registered apparatus information 430 of the first user may include registered apparatus information of the first user and information about a range of authorization of each of the registered apparatuses. Even though FIG. 15 illustrates only the registered apparatus information 430 of the first user, the memory 230 of FIG. 12 may also store the apparatus information with respect to other users.

As illustrated in FIGS. 13 to 15, user information, relationship information of a user, and apparatus information of a user, which are stored in the memory 230 (of FIG. 12) may be table-type data.

Figure 16:
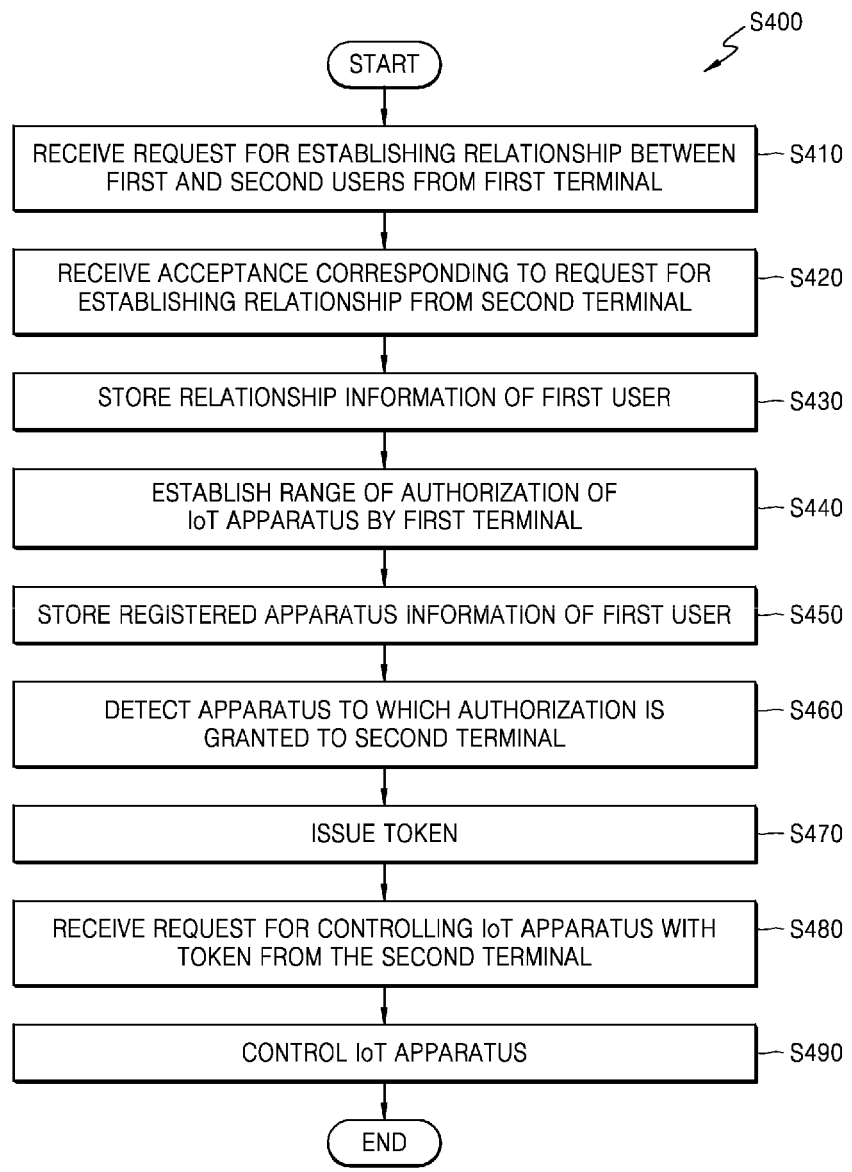
FIG. 16 is a flowchart of an illustrative method (S400) of operating a server of FIG.

FIG. 16 is a flowchart of an illustrative operation method (S400) of the example server 200 of FIG. 1. The above descriptions may also apply to the method (S400) of FIG. 16.

Referring to FIGS. 1 and 16, the server 200 may receive a request for establishing a relationship between first and second users from the first terminal 100-1 accessing the server 200 using a first identifier, which is an identifier of the first user 10-1 (S410). The request for establishing the relationship may be about including the second user to a relationship group.

The server 200 may transmit the request for establishing the relationship from the first user 10-1 to the second terminal 100-2 which accesses the server 200 using a second identifier, which is an identifier of the second user 10-2.

The server 200 may receive an acceptance corresponding to the request for establishing the relationship from the second terminal 100-2 (S420). The relationship between the first and second users 10-1 and 10-2 is established according to the acceptance of the second terminal 100-2. The server 200 may store relationship information of the first user (e.g., FIG. 14) (S430).

The server 200 may establish a range of authorization for at least one registered apparatus registered as an apparatus of the first user in response to a request received from the first terminal 100-1 (S440). In this case, a range of authorization corresponding to an IoT apparatus from among the at least one registered apparatus may be established as a relationship group including the second user. The server 200 may store the registered apparatus information of the first user (e.g., FIG. 15) (S450).

The server 200 may detect an apparatus to which authorization is granted to the second terminal 100-2 (S460). The server 200 may detect whether an IoT apparatus to which authorization is granted to the second user exists among the registered apparatuses of the first user, based on the relationship information of the first user and the registered apparatus information of the first user.

If the IoT apparatus whose authorization is extended to the second user is detected, the server 200 may issue a token of authorization of the second user corresponding to the IoT apparatus (S470). The server 200 may transmit the issued token to the second terminal 100-2.

The server 200 may receive a request for controlling the IoT apparatus with the token from the second terminal 100-2 (S480). The server 200 may confirm the authorization of the second user corresponding to the IoT apparatus based on the token. After confirming the authorization of the second user, the server 200 may control the IoT apparatus responding to the request of the second terminal 100-2 (S490).

As described above, according to an example embodiment, the authorization for the registered apparatus of a first user may be extended to a second user who is related to the first user, without performing an individual registering process. The second user may have the authorization for the registered apparatus of the first user without it being necessary to perform a complicated registering process. Therefore, user convenience may be improved.

Furthermore, according to a selection of a first user, who is an original owner of the authorization for the IoT apparatus, the authorization may be extended to other users. Therefore, the certainty that other users having extended authorization are legitimate users corresponding to the IoT apparatus may be improved.

Furthermore, a first user may select both of a second user for extending authorization and the relationship between the first and second users. Therefore, a complicated data process to select the second user or to analyze the relationship between the first and second users is not necessary. Therefore, a system overhead generated when the authorization is extended may not increase.

The embodiments of the present invention may be written as computer programs and may be implemented in general-use digital computers that execute the programs using a computer-readable recording medium.

Examples of the computer-readable recording medium include magnetic storage media (e.g., ROM, floppy disks, hard disks, etc.), optical recording media (e.g., CD-ROMs, or DVDs), etc), and transmission media such as Internet transmission media.

It should be understood that the example embodiments described herein should be considered in a descriptive sense only and not for purposes of limitation. Descriptions of features or aspects within each example embodiment should typically be considered as available for other similar features or aspects in other example embodiments.

While one or more example embodiments have been described with reference to the figures, it will be understood by those of ordinary skill in the art that various changes in form and details may be made therein without departing from the spirit and scope as defined by the following claims.

What is claimed is:

1. A computer program product comprising a non-transitory computer-readable storage medium comprising instructions which, when executed by at least one processor, cause the at least one processor to:

access at least one server using an identifier of a first user;

display Internet of Things (IoT) apparatus information of the first user on a screen of the first user;

receive a selection of an IoT apparatus based on the displayed IoT apparatus information;

display a user interface (UI) for extending authorization of the IoT apparatus on the screen of the first user, the UI including a list of user groups; and based on a selection of a user group in the list, transmit to a second user a request for acceptance by the second user, wherein users of the selected user group who accept the request have authorization of the IoT apparatus to access and control the IoT apparatus through the at least one server.

2. The computer program product of claim 1, wherein the identifier of the first user and identifiers of the users of the selected user group who accept the request are registered in the at least one server.

3. The computer program product of claim 1, wherein the IoT apparatus is registered as an apparatus of the first user in the at least one server.

4. The computer program product of claim 1, wherein the IoT apparatus is registered in the at least one server as an apparatus of the users of the selected user group who accept the request.

5. The computer program product of claim 1, wherein the IoT apparatus is registered as an apparatus of the first user based on a direct interaction with a physical interface of the IoT apparatus.

6. The computer program product of claim 1, wherein the IoT apparatus is registered as an apparatus of the users of the selected user group who accept the request without a direct interaction with a physical interface of the IoT apparatus.

7. The computer program product of claim 1, wherein users of the selected user group who do not accept the request do not have the authorization of the IoT apparatus.

8. The computer program product of claim 1, wherein a token regarding the IoT apparatus is transmitted to the users of the selected user group who accept the request.

9. An electronic device comprising:
a memory storing instructions; and
at least one processor configured to execute the instructions to:
access at least one server using an identifier of a first user;
display Internet of Things (IoT) apparatus information of the first user on a screen of the first user;
receive a selection of an IoT apparatus based on the displayed IoT apparatus information;
display a user interface (UI) for extending authorization of the IoT apparatus on the screen of the first user, the UI including a list of user groups; and
based on a selection of a user group in the list, transmit to a second user a request for acceptance by the second user, wherein users of the selected user group who accept the request have authorization of the IoT apparatus to access and control the IoT apparatus through the at least one server.

10. The electronic device of claim 9, wherein the identifier of the first user and identifiers of the users of the selected user group who accept the request are registered in the at least one server.

11. The electronic device of claim 9, wherein the IoT apparatus is registered in the at least one server as an apparatus of the users of the selected user group who accept the request.

12. The electronic device of claim 9, wherein the IoT apparatus is registered as an apparatus of the users of the selected user group who accept the request without a direct interaction with a physical interface of the IoT apparatus.

13. The electronic device of claim 9, wherein a token regarding the IoT apparatus is transmitted to the users of the selected user group who accept the request.

14. A method comprising:
accessing at least one server using an identifier of a first user;
displaying Internet of Things (IoT) apparatus information of the first user on a screen of the first user;
receiving a selection of an IoT apparatus based on the displayed IoT apparatus information;
displaying a user interface (UI) for extending authorization of the IoT apparatus on the screen of the first user, the UI including a list of user groups; and
based on a selection of a user group in the list, transmitting to a second user a request for acceptance by the second user, wherein users of the selected user group who accept the request have authorization of the IoT apparatus to access and control the IoT apparatus through the at least one server.

15. The method of claim 14, wherein the identifier of the first user and identifiers of the users of the selected user group who accept the request are registered in the at least one server.

16. The method of claim 14, wherein the IoT apparatus is registered in the at least one server as an apparatus of the users of the selected user group who accept the request.

17. The method of claim 14, wherein the IoT apparatus is registered as an apparatus of the users of the selected user group who accept the request without a direct interaction with a physical interface of the IoT apparatus.

18. The method of claim 14, wherein a token regarding the IoT apparatus is transmitted to the users of the selected user group who accept the request.

19. A computer program product comprising a non-transitory computer-readable storage medium comprising instructions which, when executed by at least one processor, cause the at least one processor to:
access at least one server using an identifier of a second user;
receive a request for acceptance by the second user regarding an Internet of Things (IoT) apparatus, from a first user having authorization of the IoT apparatus and selecting a user group in a list of user groups displayed on a screen of the first user;
in response to an acceptance of the request, acquire the authorization of the IoT apparatus to access and control the IoT apparatus of the first user through the at least one server; and
display IoT apparatus information including information of of the IoT apparatus of the first user on a screen of the second user, and access and control the IoT apparatus of the first user through the at least one server.

20. An Internet of Things (IoT) apparatus comprising:
a physical interface;
a memory storing instructions; and
at least one processor configured to execute the instructions to:
allow a first electronic device of a first user to register the IoT apparatus in at least one server based on the first user's interaction with the physical interface, wherein the first user has authorization of the IoT apparatus to access and control the IoT apparatus through the at least one server; and
perform a corresponding function by the first electronic device of the first user and a second electronic device of a second user accessing and controlling the IoT apparatus through the at least one server,
wherein the authorization of the IoT apparatus to access and control the IoT apparatus through the at least one server is extended to the second user accepting a request from the first user, without the second user's interaction with the physical interface, and
wherein the second user is included in users of a user group which is selected, by the first user, in a list of user groups displayed on a screen of the first user.

* * * * *